March 12, 1940.　　H. D. COLMAN　　2,193,190
SELF-ADJUSTING HYDRAULIC ACTUATOR
Filed Feb. 23, 1937
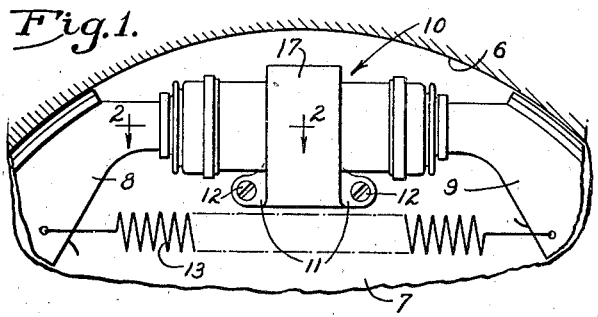
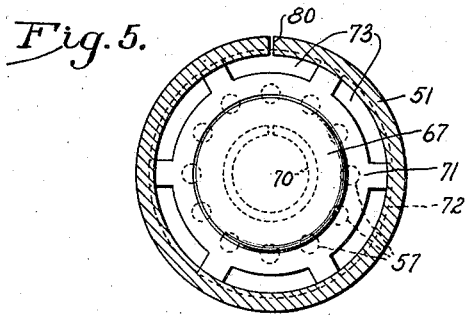
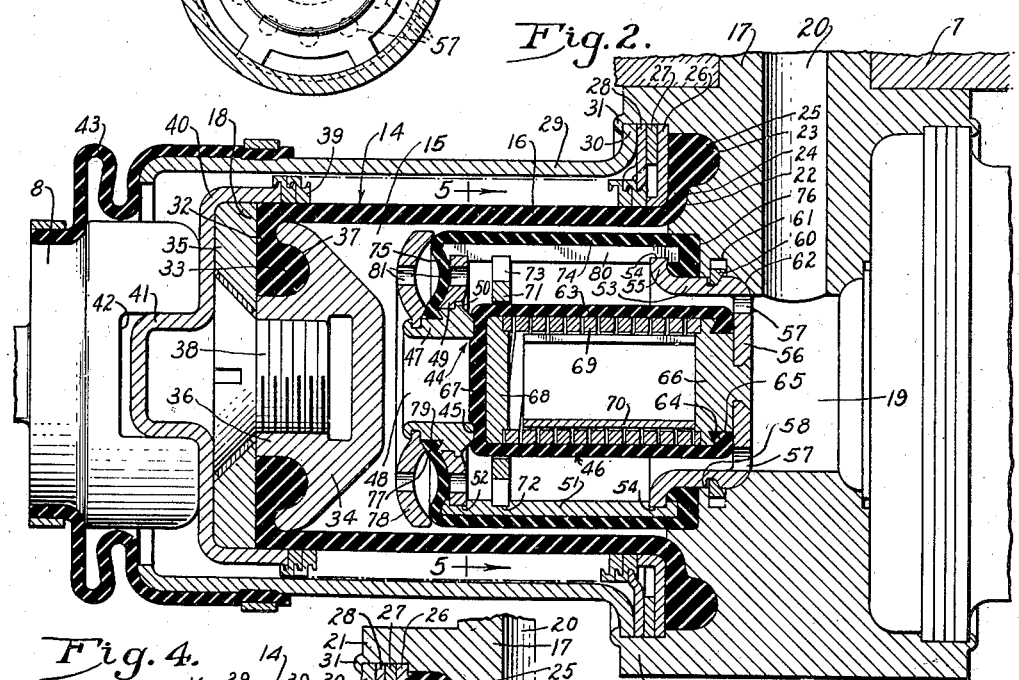
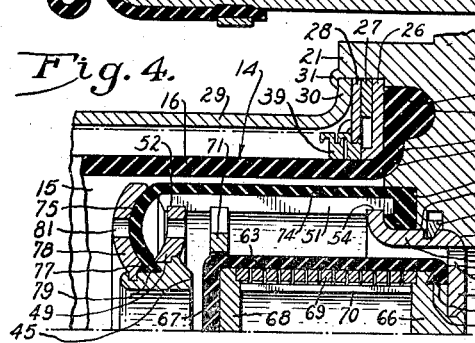
INVENTOR
Howard D. Colman
BY
Parker, Carlson, Pitner & Hubbard
ATTORNEYS Patented Mar. 12, 1940

2,193,190

UNITED STATES PATENT OFFICE 2,193,190

SELF-ADJUSTING HYDRAULIC ACTUATOR

Howard D. Colman, Rockford, Ill.

Application February 23, 1937, Serial No. 127,154

30 Claims. (Cl. 188—152)

The present invention relates generally to improvements in hydraulic actuators for brakes, and the like, and has particular reference to an actuator that is self-adjustable to maintain automatically a predetermined release clearance regardless of wear.

One of the objects of the present invention is to provide a brake actuator having novel means for trapping a predetermined body of liquid which serves as a stop to limit the release movement, and which is automatically adjustable in volume to define the desired release clearance.

Another object is to provide a hydraulic brake actuator having a new and improved release clearance adjuster which affords an extensive wear range limited only by the maximum extent of movement of the actuator, and which is adapted to effect minutely graduated adjustments to compensate accurately for wear.

A further object is to provide a trapped liquid clearance adjuster which is operable to effect adjustments in either direction as required to maintain the predetermined release clearance.

Still another object resides in the provision of an automatic trapped-liquid clearance adjuster which is operable to relieve excessive pressure, such, for example, as might result in an automotive vehicle brake in the event of an over-adjustment due to drum contraction after expansion from heat.

A further object resides in the provision of a new and improved hydraulic brake actuator having a hermetically sealed pressure applying element, and having means for automatically trapping an adjustable body of the actuating liquid within the element to maintain a predetermined release clearance.

Various general objects reside in the provision of an automatic clearance adjuster of the foregoing character which is housed within the actuator, and which is simple and inexpensive in construction, and efficient, reliable and sensitive in operation.

Further objects and advantages will become apparent as the description proceeds.

In the accompanying drawing, Figure 1 is a fragmentary side view of a hydraulic automotive vehicle brake having an automatic clearance adjuster embodying the features of my invention.

Fig. 2 is a fragmentary longitudinal sectional view of the brake actuator taken along line 2—2 of Fig. 1, and illustrating the parts in the position occupied during brake release.

Fig. 3 is a fragmentary sectional view similar to Fig. 2, but illustrating the parts in the position occupied after take-up of the brake clearance.

Fig. 4 is a fragmentary sectional view similar to Fig. 2, but illustrating the parts in the position occupied during brake application.

Fig. 5 is a transverse sectional view on a reduced scale taken along line 5—5 of Fig. 2.

Referring more particularly to the drawing, the self-adjuster for compensating for wear is especially adapted for, and hence shown, in a specific arrangement in connection with a hydraulic automotive vehicle brake. It is to be understood, however, that the invention in various of its broad aspects is not limited to any particular form of brake nor arrangement therein, but is adapted for various kinds and types of brakes and similar devices, and is intended to cover all equivalent, modified or alternative constructions and adaptations coming within the spirit and scope of the appended claims.

The brake selected for purposes of illustration, comprises a cylindrical drum 6 adapted for rotation with a wheel (not shown), and substantially closed at one end by a removable backing plate 7. Two arcuate brake shoes 8 and 9, with a suitable brake lining, are pivotal into engagement with the interior of the drum 6. The free ends of the shoes 8 and 9 are operatively related to a hydraulic actuator 10 interposed therebetween and rigidly mounted as by means of lugs 11 and bolts 12 to the backing plate 7. A tension spring 13 is connected at opposite ends to the shoes 8 and 9, and tends to retract them out of engagement with the drum 6.

The brake actuator 10 is of the double end type having oppositely acting pressure applying elements for spreading the shoes 8 and 9. Since the opposite ends of the actuator 10 are substantially alike, only one end thereof, as illustrated in Fig. 2, will be described in detail. The pressure applying element for actuating the shoe 8 may be of any suitable character, and is herein shown as of the hermetically sealed type disclosed in my copending application Serial No. 118,205, filed December 30, 1936. More particularly, the pressure applying element comprises a diaphragm or bellows which may be made of a suitable resilient or flexible material, such as rubber or a rubber composition, and which is in the form of a cup 14 defining an internal pressure chamber 15 adapted to receive brake liquid under pressure from a suitable source of supply such, for example, as a pedal operated master actuator (not shown). The cup 14 has an axially extensible and contractible cylindrical wall 16 of uniform and constant diameter reenforced externally to resist the pressure of the brake liquid in the chamber 15, and connected at one end with a liquid-tight seal to a hollow body or base member 17. The bottom of the cup 14 is closed by a liquid-tight reenforced transverse wall constituting a brake applying head 18 axially movable in response to the reversible pressure differential between the force of the return spring 13 and the pressure of the brake liquid. In action and function, the head 18 is comparable to a piston having a constant effective pressure area, and hence the cup 14 is hereinafter referred to as a piston bellows.

The base member 17 constitutes the stationary body of the actuator 10. It is formed with a central supply and relief chamber, preferably a bore 19, which opens to the interior of the brake bellows 14, and which has an inlet and discharge passage 20 leading to the liquid source.

To provide for the liquid-tight connection with the piston bellows 14, the base member 17 is formed at one end and concentrically about the bore 19 with an annular flange 21 and with an annular groove 22 just within and at the base of the flange. The bottom of the groove 22 is stepped, with the inner marginal portion relatively shallow and smoothly curved toward the face of the base member 17, and with the outer marginal portion relatively deep and rounded as indicated at 23. The fixed end of the wall 16 is formed with an external annular flange 24 which seats in and conforms in shape to the groove 22, an outer peripheral rib or bead 25 engaging in the recess 23. Positioned in superimposed relation against the flat side of the flange 24 and centered by the flange 21 are a clamping ring 26, a spacer ring 27 and an anchor ring 28. An antibuckling tube or housing 29 encloses and extends in concentrically spaced relation to the wall 16, and is formed on its inner end with an external peripheral flange 30 disposed against the anchor ring 28. The rings 26 to 28 and flange 30 are riveted in position by upsetting the metal of the base member 17 over the outer edge of the flange 30 as indicated at 31, thereby clamping the flange 24 of the wall 16 in position under a heavy deflection pressure to provide a hermetic seal.

The piston head 18 comprises an internal annular flange 32, on the movable end of the wall 16, which is formed with a rib or bead 33 at the inner periphery, and which is clamped under a heavy deflection pressure between two opposed rigid disks 34 and 35. The inner disk 34, which is the same in diameter as the interior of the wall 16, has an axial threaded sleeve 36 extending snugly through the flange 32 for end abutment with the disk 35, and is formed about the flange with an annular groove 37 adapted to receive the rib 33. The disks 34 and 35 are secured together as by means of a screw bolt 38 threaded into the sleeve 36 to clamp the flange 32 therebetween. The flange 32 is so formed that when free from deflection it is somewhat smaller in diameter than the external diameter of the wall 16 and is somewhat thicker than the space between the disks 34 and 35. However, when the screw bolt 38 is tightened to clamp the disk 35 against the end of the sleeve 36, the flange 32 is compressed, thereby placing the rubber under a heavy deflection pressure to effect a liquid-tight seal, and causing radial deflection to increase the external diameter to that of the wall 16.

The cylindrical wall 16 is confined against radial deformation by means of a reenforcement 39 which is rigid and nondeformable diametrically but readily extensible and contractible axially, and which is interposed between the wall 16 and the tube 29. The reenforcement 39 may be made of any suitable material such, for example, as strip steel, and may be provided in various forms. In the present instance, the rings or convolutions are generally Z-shaped in cross section with the legs of adjacent convolutions overlapping to provide a lost motion connection. One end of the reenforcement 39 is nonrotatably anchored to the ring 28. The other end of the reenforcement 39 is nonrotatably anchored to a cup-shaped member 40 in which the disk 35 is seated and which is formed with a diametrical rib 41 engaging a complementary groove 42 in the free end of the brake shoe 8. A flexible bellows 43 is tightly secured at opposite ends respectively to the shoe 8 and the outer end of the tube 29, and prevents the entry of dirt, grit and other foreign matter, and the escape of lubricant from the reenforcement 39.

It will be understood that in the operation of the actuator 10, fluid under pressure is supplied through the passage 20 to the chamber 19 and from there to the interior of the brake bellows 14. Thereupon, the piston head 18 is actuated to apply the brake shoe 8, this movement being permitted by axial extension of the wall 16. The reenforcement 39 affords a rigid peripheral support for the wall 16, but permits extension and contraction upon the application of a very light force. The range of axial movement is comparatively small so that the diameter remains substantially constant. Friction between the wall 16 and the reenforcement 39 is practically eliminated. By reason of the substantially uniform spacing of the successive rings or convolutions of the reenforcement 39, the rubber or other material of which the wall 16 is made is not subjected to objectionable crimping, bending, pinching or excessive distention, thereby preventing physical injury and internal or molecular friction.

One of the primary features of the invention resides in limiting the return flow of the brake actuating liquid from the brake bellows 14 upon release of the brake so as to maintain automatically a constant braking clearance regardless of wear on the brake shoes 8 and 9. The means for this purpose includes a normally closed valve 44 which is disposed between the supply chamber 19 and the chamber 15, and which is under the control of the hydraulic pressure in the brake system. The arrangement is such that when the hydraulic pressure rises to a predetermined value sufficient to take up the normal brake clearance, the valve 44 will open, and conversely when the pressure drops to this value, the valve will close. As a result, an unrestricted flow of the liquid is permitted to apply the heavy brake pressure, but upon brake release the valve 44 closes to trap a body of the liquid in the chamber 15 of such volume that retraction of the shoes 8 and 9 is limited to a predetermined clearance.

In the preferred form, the valve 44 comprises a stationary annular seat 45 and an axially movable valve member 46. The seat 45 is formed on one end of a sleeve 47 which defines a central flow passage 48, and which is rigidly connected, as by a press fit, to an encircling annular disk 49. A peripheral rib 50 on the sleeve 47 engages one side of the disk 49 to resist the closing pressure of the valve 44. The disk 49 in turn is rigidly supported in the outer end of a valve housing in the form of a longitudinally split tube 51. Preferably, an internal annular groove 52 in the tube 51 interfits with the outer peripheral margin of the disk 49.

The tube 51 extends centrally into the piston bellows 14, and is suitably supported at its base end on an annular cup 53. In the present instance, an internal annular groove 54 in the tube 51 interfits with a peripheral flange 55 on the rim of the cup 53. It will be understood that the assembly is effected by expanding the tube 51 against the force of its resiliency to receive the disk 49 and the flange 55, and then moving the latter respectively into registration with the grooves 52 and 54, whereupon the tube will contract to lock the interfitting parts securely together.

The base of the cup 53 has a bottom wall 56 formed with suitable apertures 57 for the passage of the brake liquid, and is inserted into an end enlargement 58 of the supply chamber or bore 19. To provide suitable locking means, the cup 53 is formed with an external peripheral groove 59 adapted to receive a resilient split ring 60 projecting from an annular groove 61 in the bore enlargement 58. Preferably, the inner side of the groove 59 and the corresponding side of the ring 60 are inclined so that the cup 53 is held in a fixed position against a curved shoulder 62 at the inner end of the bore enlargement. It will be understand that when the cup 53 is inserted into the bore enlargement 58 the curved base edge will act to expand the ring 60 into the groove 61, and that when the cup is in position the ring will contract and hence snap into the groove 59 to complete the assembly.

The valve member 46 comprises a pressure responsive bellows or diaphragm, preferably in the form of a rubber cup having an axially contractible and extensible cylindrical wall 63 anchored at one end to the wall 56. In the present instance, the stationary end of the wall 63 is formed with an internal annular flange 64 which is positioned in a peripheral dovetail groove 65 in a disk 66 riveted to the wall 56, and which is clamped thereby under deflection pressure against the wall 56. The movable end of the wall 63 is closed by a transverse wall 67 which is adapted for engagement with the valve seat 45 and hence defines the valve face. A disk 68 of rigid material is disposed against the inside of the end wall 67, and serves as a reenforcing backing for the latter. A coiled compression spring 69 is disposed within the cup against the interior of the wall 63 and in opposite end abutment with the disks 66 and 68, and tends to urge the end wall 67 into engagement with the valve seat 45.

It will be evident that the valve bellows 46 is sealed internally under atmospheric pressure, and is exposed externally to the pressure of the brake liquid. The spring 69 not only tends to close the valve 44, but also affords an internal peripheral reenforcement for the peripheral wall 63. Hence, the diameter of the wall 63 remains constant, and the movable end wall 67 defines the effective diaphragm area. Fixed to the disk 66 and extending therefrom almost through the spring 69 is a tube 70 which serves to prevent buckling of the spring, and the free end of which constitutes a stop for the disk 68 to limit the opening movement of the valve member 46.

If desired, a guide ring 71 may be mounted in the tube 51 to support and center the movable end of the valve bellows 46. The outer periphery of the ring 71 is clamped with an internal annular groove 72 in the tube 51, and is formed with a plurality of notches 73 to afford a free passage for the brake liquid.

The interior of the brake bellows 14 is sealed from the chamber 19, except at the valve 44, by a pressure responsive partition bellows or rubber cup having a peripheral wall or sleeve 74 anchored to the base member 17, and having a bottom or end wall 75 anchored to the seat sleeve 47. The inner end of the sleeve 74 is confined under deflection pressure, by the adjacent end of the tube 51 and the cup 53 and flange 55, within an annular notch 76 formed in the base member 17 and opening peripherally to the outer end of the bore enlargement 58. Also, the inner peripheral edge of the end wall 75 is formed with an enlarged rib or bead 77 which is confined under deflection pressure by a disk 78 within a dovetail notch 79 in the periphery of the sleeve 47 at the base of the disk 49.

The sleeve 74 has a free form slightly less in diameter than the tube 51, and hence normally encircles the latter under tension, and is reenforced internally thereby against the pressure of the liquid in the chamber 15. However, the sleeve 74 is distensible by the pressure of the liquid which may pass through suitable openings in the tube 51 such as the longitudinal split 80. During initial brake application, and until the valve 44 opens, the distension sleeve 74 serves to transmit the applied liquid pressure, in excess of the residual pressure of the trapped liquid, to the latter, thereby equalizing the pressure on the valve face 67 at opposite sides of the annular valve seat 45.

The end wall 75 serves as a clearance diaphragm having a limited reversible movement between the disks 49 and 78 to permit a slight displacement of the trapped liquid after closure of the valve 44. The disks 49 and 78 are dished or concave to provide a good backing for the clearance diaphragm 75 in either position of adjustment, and are so spaced that the trapped liquid displacement will permit retraction of the brake shoes 8 and 9 through the desired clearance upon brake release. Suitable openings 81 are formed in the disks 49 and 78 for the free passage of liquid so that the clearance diaphragm 75 will be responsive to any pressure differential. The diaphragm 75 has a free form to the left of a greater curvature than the disk 78, and normally tends to engage the latter as illustrated in Fig. 4 by reason of distortion pressure. It will be understood that the disks 49 and 78 may be formed and spaced to provide the proper displacement for piston bellows 14 of various sizes.

In operation, the parts assume the positions illustrated in Fig. 2 when the brake is off. Under this condition, the valve 44 is closed by the spring 69 in opposition to the residual pressure P of the trapped liquid which is determined by the retractile force of the spring 13. The brake liquid in the chamber 19 and up to the valve 44 is under a zero or low initial pressure $P_1$ less than the pressure P. Hence, the distension sleeve 74 engages the tube 51, and the clearance diaphragm 75 is flexed against the inner stop disk 49.

To apply the brake, liquid under increasing pressure is supplied to the chamber 19, but cannot pass to the chamber 15 so long as the valve 44 is closed. When the pressure $P_1$ equals the pressure P, the diaphragm 75 will flex into engagement with the disk 78, as illustrated in Fig. 3, to move the brake shoes 8 and 9 through the normal clearance into light engagement with the drum 6. As the pressure P₁ continues to rise, the sleeve 74 will distend to equalize the pressure acting on the valve face 67 at opposite sides of the seat 45. Shortly thereafter, the liquid pressure will compress the valve bellows 46 against the action of the spring 69 to open the valve 44 as illustrated in Fig. 4, and cause the sleeve 74 to return into engagement with the tube 51. The brake liquid is now free to pass directly into the chamber 15 in any volume required to apply the brake with full pressure.

To release the brake, the chamber 19 is relieved, thereby resulting in a progressive pressure drop, and an attendant flow of liquid from the chamber 15 through the valve 44, due partially to previous distortion of the parts and particularly the drum 6. When the pressure drops to a point where the shoe 8 is about to leave the drum 6, the valve 44 will close, thereby trapping a definite body of liquid in the chamber 15. The pressure P₁ will continue to drop, while the pressure P of the trapped liquid will be determined by the retractile force of the spring 13 which is insufficient to overcome the valve spring 69. When the pressure P₁ falls below the pressure P, the clearance diaphragm 75 will be flexed by the pressure differential to engage the disk 49, thereby permitting retraction of the shoe 8 through the predetermined clearance.

The adjuster serves to relieve excessive pressures, such as may occur in the event of overadjustment by reason of heat expansion of the drum 6 followed by contraction on cooling. If such pressures should tend to occur in the chamber 15, the valve 44 will open in response thereto to vent part of the trapped liquid. Thereafter, the normal clearance may be reestablished by a single application of the brake.

It will be evident that I have provided a novel clearance adjuster for hydraulic brakes which utilizes a trapped body of the brake liquid as a retractile stop. The adjuster is not subject to mechanical disadvantages, such as frictional variations, limitations as to range and adjustment increments, and objectionable space requirements. The range of adjustment is unlimited within the maximum extent of movement of the actuator 10, and the adjustment increments may be infinitesimal or of any size as required to obtain an accurate compensation for wear. All brakes of the vehicle are adjusted separately and uniformly. The adjuster is especially adapted for use in hermetically sealed braking systems wherein no loss of liquid from the trapped body past the piston element is possible.

I claim as my invention:

1. In an automotive vehicle brake, in combination, a fixed support, a rotatable brake drum, a friction element mounted on said support for movement through a braking clearance into and out of engagement with said drum, spring means tending to retract said element from said drum, and a self-contained hydraulic actuator unit mounted on said support and having a liquid pressure responsive wall for moving said element mechanically into engagement with said drum, said actuator unit including means therein automatically operable to trap a predetermined body of brake liquid therein to limit the retractile movement of said wall and said element and to increase or decrease said body of liquid as required to maintain a predetermined clearance after each brake actuation regardless of brake wear and brake drum expansion and contraction.

2. A hydraulic power actuator for brakes and the like comprising, in combination, a hollow base defining a liquid supply chamber, a yieldable hermetically sealed cup closed at the outer end and connected at the other end to said base for communication with said chamber, an axially extensible and contractible reenforcement encircling said cup and anchored at opposite ends respectively to said base and for movement with the outer end of said cup, an antibuckling tube mounted on said base and closely encircling said reenforcement, and means automatically operable below a predetermined liquid pressure to trap a body of liquid in said cup.

3. A hydraulic power actuator for brakes and the like comprising, in combination, a hollow base defining a liquid supply chamber, a yieldable hermetically sealed cup closed at the outer end and connected at the other end to said base for communication with said chamber, an axially extensible and contractible reenforcement encircling said cup and anchored at opposite ends respectively to said base and for movement with the outer end of said cup, and normally closed valve means controlling the communication between said chamber and said cup, and adapted to open in response to a rise in liquid pressure to a predetermined value.

4. A hydraulic power actuator for brakes and the like comprising, in combination, a hollow base defining a liquid supply chamber, a yieldable hermetically sealed cup having a movable closed pressure transmitting end and having a liquid tight connection with said base for communication with said chamber, and normally closed valve means mounted within said cup and controlling the passage of liquid between said chamber and said cup, said valve means having a stationary seat and a spring seated valve member pressure responsive to open upon a predetermined increase and to close upon a predetermined decrease in the pressure in said chamber.

5. A hydraulic power actuator for brakes and the like comprising, in combination, a hollow base defining a liquid supply chamber, a yieldable hermetically sealed piston bellows having a closed movable end and being in communication with said chamber, and an axially extensible and contractible reenforcement for said bellows and anchored at opposite ends respectively to said base and for movement with said movable end of said bellows, said reenforcement comprising a coil having a spiral groove in one edge and a spiral flange on the other edge engaging in said groove.

6. A hydraulic actuator for effecting pressure application of a movable member against a retractile force, said actuator comprising, in combination, a pressure chamber including a movable pressure transmitting wall adapted for operative association with said member, a liquid supply chamber adapted to be placed under a varying liquid pressure, and means including a sealed partition wall between said chambers reversibly movable in response to reversal of pressure differences in said chambers and including a normally closed valve for controlling communication between said chambers in response to the liquid pressure in said supply chamber, said valve being adapted automatically to open and close respectively at liquid pressure in said pressure chamber above and below a predetermined pressure in excess of said retractile force.

7. A hydraulic actuator for effecting pressure application of a movable member against a retractile force, said actuator comprising, in combination, a pressure chamber including a movable pressure transmitting wall adapted for operative association with said member, a liquid supply chamber adapted to be placed under a varying liquid pressure, a partition between said chambers and including a stationary valve seat defining a flow passage between said chambers, and a movable valve member normally spring-urged against said seat in opposition to the pressure in said pressure chamber and adapted to open in response to a predetermined pressure rise in said pressure chamber.

8. A hydraulic actuator for effecting pressure application of a movable member against a retractile force, said actuator comprising, in combination, a pressure chamber including a movable pressure transmitting wall adapted for operative association with said member, a liquid supply chamber adapted to be placed under a varying liquid pressure, a valve for controlling communication between said chambers and having a stationary valve seat and a normally spring seated valve member, and a pressure responsive element independent of said valve member for transmitting liquid pressure from said supply chamber to said pressure chamber when said valve is closed, said valve being adapted to open in response to a predetermined pressure rise in said chambers, and opening in a direction counter to the flow of liquid from said supply chamber to said pressure chamber.

9. A hydraulic actuator system for effecting pressure application of a movable member against a retractile force, said actuator system comprising, in combination, a pressure chamber including a movable pressure transmitting wall adapted for operative association with said member, a liquid supply chamber adapted to be placed under a varying liquid pressure, a valve for controlling communication between said chambers and adapted to close in response to a predetermined pressure drop in said chambers to trap a body of liquid in said pressure chamber, and means independent of said valve and responsive to a further pressure drop in said supply chamber to effect a predetermined enlargement of said pressure chamber.

10. In a hydraulic actuator, in combination, with a liquid supply chamber, a pressure chamber adapted for communication with said supply chamber, a power applying element movable in response to the pressure in said pressure chamber, and means for retracting said element, a clearance adjuster including a normally closed valve controlling said communication, said valve being adapted to open in a direction opposite to the liquid flow from said supply chamber to said pressure chamber in response to a predetermined rise in the liquid pressure in said pressure chamber and to close in response to a predetermined drop in the liquid pressure in said pressure chamber, whereby a body of liquid will be trapped in said pressure chamber under a normal residual pressure determined by said retracting means and normally insufficient to open said valve to limit the extent of the retractile movement of said element, said valve however being adapted to open directly in response to an excessive residual pressure to relieve said trapped body of liquid.

11. In a hydraulic actuator, in combination with a liquid supply chamber, a pressure chamber adapted for communication with said supply chamber, a power applying element movable in response to the pressure in said pressure chamber, and means for retracting said element, a clearance adjuster including a normally closed valve controlling said communication, said valve being adapted to open in response to a predetermined rise in the liquid pressure and to close in response to a predetermined drop in the liquid pressure, whereby a body of liquid will be trapped in said pressure chamber under a residual pressure determined by said retracting means and insufficient to open said valve, and pressure responsive means operable upon a drop in pressure in said supply chamber below that of said trapped body of liquid to cause said body to shift and thereby permit retraction of said element through a predetermined distance.

12. In a hydraulic actuator, in combination with a liquid supply chamber, a pressure chamber adapted for communication with said supply chamber and including a brake applying element movable in response to the pressure in said pressure chamber, a flexible partition wall between said chambers, a stationary valve seat defining a flow passage opening through said wall, said partition wall having a distention sleeve and a reversibly movable clearance diaphragm, reenforcing means for supporting said distention sleeve against the pressure in said pressure chamber, spaced means for limiting the movement of said clearance diaphragm and for backing up the latter in either extreme position of adjustment, said diaphragm in its free form normally being flexed toward said pressure chamber, and a valve member in said supply chamber and normally engaging said seat to interrupt said communication, said valve member comprising a hermetically sealed bellows having an axially extensible and contractible peripheral wall and an end wall defining a valve face, and a coiled compression spring supporting the interior of said cylindrical wall and tending to urge said valve member into closed position.

13. In a hydraulic actuator, in combination with a liquid supply chamber, a pressure chamber adapted for communication with said supply chamber and including a brake applying element movable in response to the pressure in said pressure chamber, a stationary valve seat having a flow passage for establishing communication between said chambers, a flexible partition wall between said chambers, a stationary valve seat defining a flow passage opening through said wall, said partition wall having a distention sleeve and a reversibly movable clearance diaphragm, reenforcing means for supporting said distention wall against the pressure in said pressure chamber, spaced means for limiting the movement of said clearance diaphragm and for backing up the latter in either extreme position of adjustment, said diaphragm in its free form normally being flexed toward said pressure chamber, and a valve member in said supply chamber and normally engaging said seat to interrupt said communication, said valve member being adapted to open in response to a predetermined pressure rise in said supply and pressure chambers.

14. A hydraulic actuator for effecting pressure application of a movable member against a retractile force, said actuator comprising, in combination, a pressure chamber including a movable pressure transmitting wall adapted for operative association with said member, a liquid supply chamber adapted to be placed under a varying liquid pressure, a pressure responsive clearance diaphragm between said chambers and movable reversibly between two fixed positions in response to a reversible differential between the pressures in said chambers, and having a free form normally tending to cause movement toward said pressure chamber, and a valve controlling communication between said chambers and adapted to close upon a pressure drop to a predetermined point to trap a body of liquid in said pressure chamber, said diaphragm being movable toward said supply chamber after closure of said valve to shift said trapped body of liquid.

15. A hydraulic actuator for effecting pressure application of a movable member against a retractile force, said actuator comprising, in combination, a pressure chamber including a movable pressure transmitting wall adapted for operative association with said member, a liquid supply chamber adapted to be placed under a varying liquid pressure, a pressure responsive clearance diaphragm between said chambers and movable reversibly between two fixed positions in response to a reversible differential between the pressures in said chambers, and a normally closed valve controlling communication between said chambers and adapted to open upon a predetermined pressure rise in said supply chamber.

16. A hydraulic actuator for effecting pressure application of a movable member against a retractile force, said actuator comprising, in combination, a pressure chamber including a movable pressure transmitting wall adapted for operative association with said member, a liquid supply chamber adapted to be placed under a varying liquid pressure, a valve controlling communication between said chambers and including a fixed valve seat defining a flow passage and a pressure responsive valve member having a yieldable pressure face for engaging said seat, a reversibly movable clearance diaphragm interposed between said chambers, and spaced stop disks mounted in fixed positions at opposite sides of said clearance diaphragm.

17. A hydraulic actuator for effecting pressure application of a movable member against a retractile force, said actuator comprising, in combination, a pressure chamber including a movable pressure transmitting wall adapted for operative association with said member, a liquid supply chamber adapted to be placed under a varying liquid pressure, a valve controlling communication between said chambers and including a fixed valve seat defining a flow passage and a pressure responsive valve member having a yieldable pressure face for engaging said seat, a deflection diaphragm for transmitting liquid pressure from said supply chamber to said pressure chamber when said valve is closed, and a stationary rigid backing for limiting movement of said diaphragm toward said supply chamber, said deflection diaphragm having a free form normally tending to effect engagement with said backing.

18. A hydraulic actuator for effecting pressure application of a movable member against a retractile force, said actuator comprising, in combination, a pressure chamber including a movable pressure transmitting wall adapted for operative association with said member, a liquid supply chamber adapted to be placed under a varying liquid pressure, a valve controlling communication between said chambers and having an annular valve seat defining a flow passage and a pressure responsive valve member with a yieldable pressure face movable axially into and out of engagement with said seat and when closed exposed at opposite sides of said seat respectively to the pressures in said chambers, and pressure responsive means for transmitting the pressure in said supply chamber to said pressure chamber.

19. A hydraulic actuator for effecting pressure application of a movable member against a retractile force, said actuator comprising, in combination, a pressure chamber including a movable pressure transmitting wall adapted for operative association with said member, a liquid supply chamber adapted to be placed under a varying liquid pressure, a valve controlling intercommunication between said chambers and including a stationary valve seat, and a pressure responsive valve member consisting of a hermetically sealed cup having an end wall movable into and out of engagement with said seat, spring means normally urging said valve member toward said seat and reenforcing the peripheral wall of said cup, an antibuckling tube within said spring means and acting as a stop to limit the extent of valve opening, and external guide means for the movable end of said valve member.

20. A hydraulic actuator for effecting pressure application of a movable member against a retractile force, said actuator comprising, in combination, a pressure chamber including a movable pressure transmitting wall adapted for operative association with said member, a liquid supply chamber adapted to be placed under a varying liquid pressure, a valve controlling intercommunication between said chambers and including a stationary valve seat, and a pressure responsive valve member consisting of a hermetically sealed cup having an end wall of constant area movable into and out of engagement with said seat, and spring means normally urging said valve member toward said seat, said valve being adapted to open against the action of said spring means upon a predetermined rise in the liquid pressure acting on said end wall.

21. In a hydraulic actuator, in combination with a stationary support, a movable valve member comprising, in combination, a cup having a contractible and extensible peripheral wall hermetically sealed at one end to said support and closed at the other end by a transverse wall defining a resilient pressure face, means internally reenforcing said transverse wall, a coiled compression spring internally reenforcing said peripheral wall against external pressure, and tending to elongate said peripheral wall against external pressure acting on said face, and a tube extending from said support through said spring to prevent buckling and to define a stop limiting longitudinal contraction of said peripheral wall.

22. In a hydraulic actuator, in combination with a stationary support, a movable valve member comprising, in combination, a cup having a contractible and extensible peripheral wall hermetically sealed at one end to said support and closed at the other end by a transverse wall defining a pressure face of constant area, and means tending to extend said peripheral wall in opposition to external pressure on said face.

23. In a hydraulic actuator, in combination with a stationary support, a movable valve member comprising, in combination, a cup having a contractible and extensible peripheral wall connected at one end to said support and closed at the other end by a transverse wall defining a pressure face of constant area, and a coiled compression spring within said cup for reenforcing said peripheral wall against external pressure, and tending to elongate said peripheral wall against pressure acting on said face.

24. A hydraulic power actuator for brakes and the like comprising, in combination, a base defining a fluid supply chamber, a hermetically sealed cup of yieldable material having an axially extensible and contractible peripheral wall connected at one end to said base and closed at the other end by an axially movable transverse wall, said transverse wall comprising an inner peripheral flange of resilient material with an enlarged rounded bead at the inner edge, an internal disk having a central sleeve extending through said flange and an encircling groove receiving said bead, an external disk engaging the outer face of said flange, and means for clamping said external disk against said sleeve to secure said flange with a liquid tight seal under deflection pressure between said disks, and means for supporting said peripheral wall against radial distention by internal pressure.

25. A hydraulic power actuator for brakes and the like comprising, in combination, a base defining a fluid supply chamber, a hermetically sealed cup of yieldable material having an axially extensible and contractible peripheral wall connected at one end to said base and closed at the other end by an axially movable transverse wall, said transverse wall comprising an inner peripheral flange of resilient material with an enlarged bead at the inner edge, an internal disk having a groove receiving said bead, an external disk engaging the outer face of said flange, and means for clamping said disks together to secure said flange with a liquid tight seal under deflection pressure between said disks.

26. A hydraulic power actuator for brakes and the like comprising, in combination, a base defining a fluid supply chamber and provided on one side about said chamber with an annular groove and an encircling centering flange, a hermetically sealed cup of yieldable material having an axially extensible and contractible peripheral wall closed at one end by an axially movable transverse pressure transmitting wall, the other end of said peripheral wall comprising an external peripheral resilient flange with an enlarged bead at the outer edge seated in said groove, and disk means centered by said encircling flange for clamping said peripheral flange in said groove under deflection pressure to provide a liquid tight seal.

27. In a hydraulic actuator, in combination, a base having a liquid supply chamber opening to one side thereof and having an annular groove in said side about said chamber, a perforated cup mounted in said chamber and having a peripheral flange in axially spaced relation to said groove, a split tube connected at one end to said flange, a perforated annular disk secured in the other end of said tube, a central valve seat rigid with said disk and defining a flow passage, a second disk rigid with said seat in opposed relation to said first mentioned disk, a peripheral groove in said seat between said disks, a yieldable distention sleeve normally snugly encircling said tube, a bead on one end of said sleeve secured under deflection pressure in said annular groove by said cup and tube, a transverse clearance diaphragm integral with the other end of said sleeve and having a bead at its inner edge secured in said peripheral groove under deflection pressure by said second disk, an axially extensible and contractible pressure responsive valve member mounted at one end on said cup and having a pressure face normally engaging said seat, and means defining a pressure chamber adapted for communication through said flow passage with the interior of said tube, and having a movable pressure responsive element.

28. A hydraulic system for effecting pressure application of a movable member against a retractile force, said system comprising, in combination, a pressure chamber including a movable pressure transmitting wall adapted for operative association with said member, a liquid supply chamber adapted to be connected to said pressure chamber and to be placed under a varying liquid pressure, a pressure responsive clearance element interposed between said chambers and movable reversibly between two fixed positions in response to a reversible pressure differential between the pressures in said chambers, and a normally closed valve controlling communication between said chambers and adapted to open upon a predetermined pressure rise in said supply chamber.

29. A hydraulic system for effecting pressure application of a movable member against a retractile force, said system comprising, in combination, a pressure chamber including a movable pressure transmitting wall adapted for operative association with said member, a liquid supply chamber adapted to be in communication with said pressure chamber and to be placed under a varying liquid pressure, a valve controlling communication between said chambers and having an annular valve seat defining a flow passage and a pressure responsive valve element movable axially into and out of engagement with said seat and when closed being exposed to the pressure in said pressure chamber, and pressure responsive means for transmitting the pressure in said supply chamber to said pressure chamber.

30. A hydraulic power actuator for brakes and the like comprising, in combination, a base defining a fluid supply chamber, a hermetically sealed cup of yieldable material having an axially extensible and contractible peripheral wall connected at one end to said base and closed at the other end by an axially movable transverse wall, said transverse wall comprising an inner peripheral flange of resilient material, an internal rigid disk engaging the inner face of said flange, an external rigid disk engaging the outer face of said flange, and means for clamping said disks together to secure said flange with a liquid tight seal under deflection pressure between said disks.

HOWARD D. COLMAN.